(12) United States Patent
Skene

(10) Patent No.: US 7,945,678 B1
(45) Date of Patent: May 17, 2011

(54) LINK LOAD BALANCER THAT CONTROLS A PATH FOR A CLIENT TO CONNECT TO A RESOURCE

(75) Inventor: Bryan D. Skene, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 599 days.

(21) Appl. No.: 11/246,342

(22) Filed: Oct. 7, 2005

Related U.S. Application Data

(60) Provisional application No. 60/705,977, filed on Aug. 5, 2005.

(51) Int. Cl.
*G06F 15/16* (2006.01)

(52) U.S. Cl. ......................................................... 709/227

(58) Field of Classification Search .................. None
See application file for complete search history.

(56) References Cited

U.S. PATENT DOCUMENTS

| | | | |
|---|---|---|---|
| 5,828,847 A * | 10/1998 | Gehr et al. | 709/239 |
| 5,987,523 A * | 11/1999 | Hind et al. | 709/245 |
| 6,064,671 A | 5/2000 | Killian | |
| 6,182,139 B1 * | 1/2001 | Brendel | 709/226 |
| 6,185,619 B1 | 2/2001 | Joffe et al. | |
| 6,356,541 B1 | 3/2002 | Muller et al. | |
| 6,748,416 B2 * | 6/2004 | Carpenter et al. | 709/202 |
| 7,099,277 B2 * | 8/2006 | Sahinoglu et al. | 370/238 |
| 2003/0126200 A1 * | 7/2003 | Wolff | 709/203 |
| 2003/0195984 A1 | 10/2003 | Zisapel | |

OTHER PUBLICATIONS

Information Sciences Institute, "Transmission Control Protocol: DARPA Internet Program Protocol Specification", Postel, Jon ed., RFC 793, pp. 1-41, Sep. 1981.

Freier, Alan et al., "The SSL Protocol Version 3.0", IETF, Internet Draft, pp. 1-63, Nov. 18, 1996.

(Continued)

*Primary Examiner* — Ario Etienne
*Assistant Examiner* — Clayton R Williams
(74) *Attorney, Agent, or Firm* — Frommer Lawrence & Haug LLP; Jamie L. Wiegand

(57) ABSTRACT

A system, apparatus, and method are directed to managing network communications between a client and a server by enabling the client to make decisions involving the selection of alternate network paths. The client and/or the server may be multi-homed to a network. In one embodiment, a link load balancer provides the client with a message and/or path data that enables the client to improve its connections with the server by redirecting network packets using an alternate network path. The message may be based on a static policy at the server, changes in availability of the network connections between the client and server, changes in a quality of the network connections, paths, or the like. Redirecting the network packet by the client may include closing one network connection and establishing another network connection, and/or employing an available alternate network path to re-route network packets towards the server.

37 Claims, 8 Drawing Sheets

OTHER PUBLICATIONS

Dierks, T. et al., "The TLS Protocol Version 1.0", RFC 2246, pp. 1-80, Jan. 1999.

Needham, Jason, "Link Load Balancers Smooth Web Traffic", Network World, pp. 1-3, Sep. 16, 2002. http://www.f5.com/communication/articles/archive00/article091702.html.

Bates and Rekhter, "Scalable Support for Multi-homed Multi-provider Connectivity", RFC 2260, pp. 1-12, Jan. 1998.

Akkiraju, P. et al., Enabling Enterprise Multihoming with Cisco IOS Network Address Translation (NAT), White Paper, pp. 1-25, 1997.

F5 Networks, Inc., "A Link Load Balancing Solution for Multi-Homed Networks", White Paper, pp. 1-6, Oct. 2004.

F5 Networks, Inc., "Big-IP Link Controller Solutions Guide Version 4.5", MAN-0053-01, 2002.

F5 Networks, Inc., "Big-IP Link Controller Reference Guide Version 4.3", MAN-0054-00, 2002.

F5 Networks, Inc., "Big IP Link Controller" F5 Networks, Inc. Seattle, WA, Product Description, pp. 1-5, 2003.

Reardon, Marguerite, "A Smarter Session Switch: Arrowpoint's CS Session Switches Boast The Brain Needed For E-Commerce," Data Communications, Jan. 1999, title page, pp. 3, 5, 18.

Hewitt, John R. et al., "Securities Practice and Electronic Technology," Corporate Securities Series, (New York: Law Journal Seminars-Press) 1998, title page, bibliography page, pp. 4.29-4.3.

* cited by examiner

LINK LOAD BALANCER THAT CONTROLS A PATH FOR A CLIENT TO CONNECT TO A RESOURCE

CROSS-REFERENCE TO RELATED APPLICATIONS

This application claims the benefit of U.S. Provisional Application Ser. No. 60/705,977 entitled "Link Load Balancer That Directly Controls Path For A Client To Connect To A Resource," filed on Aug. 5, 2005, the benefit of the earlier filing date of which is hereby claimed under 35 U.S.C. §119 (e) and which is further incorporated herein by reference.

FIELD OF THE INVENTION

The present invention relates generally to network communications, and more particularly, but not exclusively, to a system and method for managing network communications by, in part, enabling a client to select network paths.

BACKGROUND OF THE INVENTION

The Internet has evolved into a ubiquitous network that has inspired many companies to rely upon it as a major resource for doing business. For example, many businesses may utilize the Internet, and similar public networking infrastructures, to manage mission critical applications, access content servers, automate assembly and production lines, and implement complex control systems.

However, many of these businesses often maintain a single link to the public network, and thereby create a potential for a single point of failure, and/or serious network vulnerability. When the link fails, the business and its customers may be left with significant downtime and financial loss. In response, some businesses consider multi-site deployments to address their availability concerns. Unfortunately, small to mid-size businesses quickly discover this option may be cost prohibitive. Multi-site deployments may face the increased technical complexity of hosting distributed applications, but may incur costly expenditures for additional equipment, space, software, and personnel.

Other businesses traditionally have selected to address their network availability issues by installing a secondary physical connection to their site. This approach, known as multi-homing, may employ Border Gateway Protocol (BGP). BGP, which is an inter-domain routing protocol, was designed to enable Internet Protocol (IP) routers to direct packets traversing along the Internet between two points. While BGP is a core technology for routing, implementing multi-homing using BGP can be costly and complex to deploy. Moreover, BGP deployments may result in limited route control, increases in data latencies, and require significant administrative overhead. Thus, it is with respect to these considerations, and others, that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
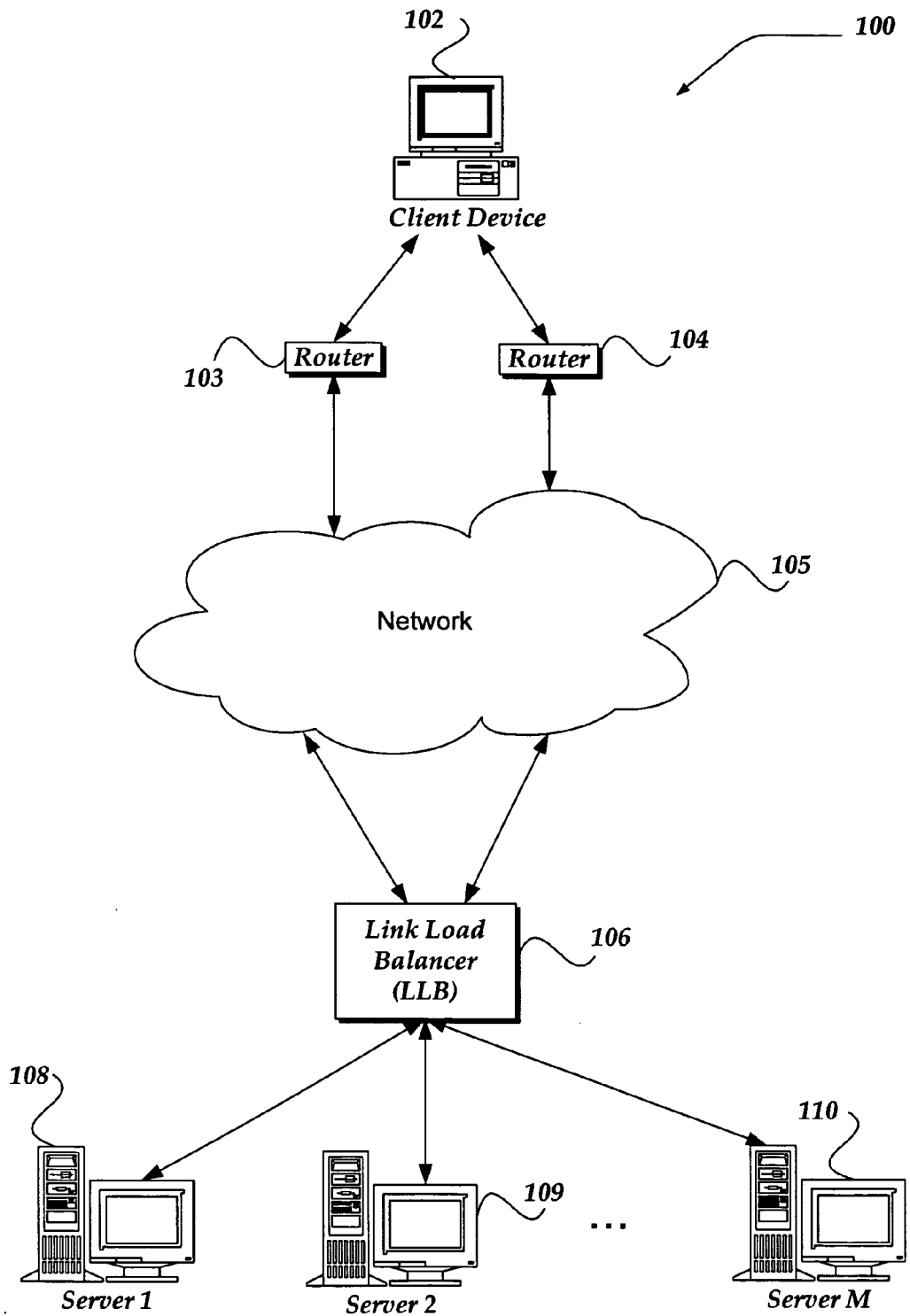
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term 'link" refers to a physical medium that is used to connect two or more computing devices sometimes called network nodes. Links may be implemented as, for example, routers, coaxial cables, fibers, satellites, Digital Subscriber Lines (DSL) links, and so forth. Links may be dedicated to two network nodes, or be shared by many network nodes.

The term "network connection" refers to a collection of links and/or software elements that enable a computing device to communicate with another computing device over a network. One such network connection may be a TCP connection. TCP connections are virtual connections between two network nodes, and are typically established through a TCP handshake protocol. The TCP protocol is described in more detail in Request for Comments 793, which is available at http://www.ietf.org/rfc/rfc0793.txt?number=793. A network connection "over" a particular path or link refers to a network connection that employs the specified path or link to establish and/or maintain a communication.

As further used herein, the term SSL connection is directed towards secure virtual connections between network nodes that may be established using an SSL handshake protocol. An SSL connection may have a session ID associated with it that is used to identify the connection. An SSL connection can be terminated, and a new SSL connection established using the same session ID as the terminated connection. When this occurs, an SSL session that began with the first SSL connection may continue with a second SSL connection. Therefore, an SSL session can have one or more SSL connections associated with it. Moreover, an application running over an SSL connection may use the SSL session ID to identify and manage the session.

A version of the SSL protocol is described in Netscape Communications Corp, Secure Sockets Layer (SSL) version 3, http://home.netscape.com/eng/ssl3/(November 1996). The TLS protocol is derived from SSL, and is described in Dierks, T., and Allen, C., "The TLS Protocol Version 1.0," RFC 2246 (January 1999), available at http://www.ietf.org/rfc/rfc2246.txt. As used throughout this application, including the claims, SSL refers to SSL, TLS, and all secure communications protocols derived therefrom.

The term "network path" or simply "path" refers to the route along which a network message may traverse from one network device, which may be a message source, to another network device, which may be a message destination. The network message may traverse one or more intermediate network devices along the path to towards its destination. Moreover, one or more network connections may be employed over a network path. A segment of a network path or a component of a network path is also considered to be a network path. Therefore, a network path may be made up of multiple network paths. A network path includes one or more links. A selection of a link for a connection or communication defines a path that at least one packet of the connection or communication will traverse.

Briefly stated, the present invention is directed towards a system, method, and apparatus for managing network communications between a client and a server by enabling the client to manage network traffic. The client may be multi-homed to a network. That is, the client may include two or more physical connections to the network. Such connections may include but not be limited to, a Digital Subscriber Line (DSL), a dial-up modem connection, an IEEE 802.11 "Wi-Fi" connection, or the like.

In one embodiment, a device configured to further manage network traffic may be situated on a server side connection and may also be multi-homed to the network. The device may be a link load balancer, traffic manager, or the like, and is herein collectively referred to as a "Link Load Balancer," or LLB.

The client may include a redirect agent that is configured to receive information about network connections and/or paths between the client and the server, the client and the LLB, or both. In one embodiment, the LLB provides the redirect agent with a message and/or path data that enables the redirect agent to improve its connections with the server by redirecting network packets using an alternate network path. In one embodiment, the message is a control channel type message. The message may be based on a static policy at the server, changes in availability of the network connections between the client and server, changes in a quality of the network connections, or the like. Redirecting the network packet by the client may include closing one network connection and establishing another network connection. Redirecting the network packet by the client may also include employing an available alternate network path to re-route network packets towards the server. For example, employing an alternate network path may be achieved by updating of a routing table to employ different next hops. In the situation where the client is multi-homed, the redirection may include selecting a different network link out of the client. Where the link load balancer and/or server are multi-homed, the redirection may also include selecting a different network link into the link load balancer and/or server. It is noted, that changing a network connection, and/or network link may also result in employing a different network path to route network packets between the client and the server.

Illustrative Operating Environment

FIG. 1 illustrates one environment in which the present invention may operate. However, not all of these components may be required to practice the invention, and variations in the arrangement and type of the components may be made without departing from the spirit or scope of the invention.

As shown in the figure, system 100 includes client device 102, routers 103-104, network 105, link load balancer (LLB) 106, and servers 108-110. Routers 103-104 are in communication with client device 102 and network 105. LLB 106 is in communication with network 105 and servers 108-110.

One embodiment of client device 102 is described in more detail below in conjunction with FIG. 2. Generally, however, client device 102 may include virtually any computing device capable of connecting to another computing device and receiving information. Such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client device 102 may also include other computing devices, such as personal computers, multiprocessor systems, microprocessor-based or programmable consumer electronics, network PCs, and the like. As such, client device 102 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

Client device 102 also may include at least one client application that is configured to receive content from another computing device. The client application may include a capability to provide and receive textual content, graphical content, audio content, alerts, messages, and the like. Moreover, client device 102 may be further configured to communicate a message, such as through a Short Message Service (SMS), Multimedia Message Service (MMS), instant messaging (IM), internet relay chat (IRC), mIRC, Jabber, and the like, between another computing device, and the like.

Client device 102 may further be configured to receive an application, program, script, or the like, from another device. For example, in one embodiment, client device 102 may receive an application from LLB 106, or even another network device, where the received application is configured to enable client device 102 to re-establish network connections to a network device, such as LLB 106, servers 108-110, or the like. For example, the application may be configured to expose an Application Programming Interface (API), or other form of communications, with the other network device. The other network device may then provide path data, settings associated with the path data, and/or messages to the application that enables client device 102 to employ an alternate network path. In one embodiment, the application is further enabled to receive path data from a variety of other sources, including routers 103-104, or the like, to assist in selecting a link that results in employing an alternate network path for a connection. In one embodiment, the application may be configured to request path data from other network devices, and examine network connections itself, or the like. In one embodiment, the application may operate using a process substantially similar to that described in more detail below in conjunction with FIGS. 4-5.

In one embodiment, client device 102 may be configured such that an end-user may operate the computing device to make requests for data and/or services from other computers on the network. Often, the requested data resides in computing devices such as servers 108-110. In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa. In one embodiment, client device 102 is a computing device that is not operated by an end-user.

As shown in the figure, client device 102 is multi-homed. That is, client device 102 may communicate with network 105 through two or more physical connections. For example, client device 102 may communicate through router 103 and/or through router 104 to network 105. The two network connections may represent different networking mediums, protocols, or the like. For example, the network connection through router 103 may represent a dial-up modem connection, while the network connection router 104 may represent a Digital Subscriber Line (DSL) connection. However, the invention is not so limited, and client device 102 may employ virtually any number of network connections, links, link types, and/or protocols, without departing from the scope or spirit of the invention. Thus, in one embodiment, client device 102 may be configured to wirelessly communicate through a plurality of wireless access points to network 105. In one embodiment, client device 102 is situated on a local area network with routers 103-104 situated at the local area network's border.

Routers 103-104 include any network device that may read a network address in the received packet and make a decision on how to route it based on any of a variety of dynamic routing protocols, including distance vector protocols, link state protocols, hybrid protocols, or the like. Routers 103-104 typically operate at layer three of the typical Open Systems Interconnection (OSI) reference model for networking. However, routers 103-104 may also provide additional functionality that operates above layer three for TCP/IP in the OSI reference model, and the like.

Routers 103-104 may include virtually any specialized computer that is optimized for communications. Routers 103-104 may also represent a set of router actions that are incorporated into a server, network card, and the like. Routers 103-104 may also be implemented as a network-layer bridge, gateway, layer three switch, or the like.

As shown in the figure, routers 103-104 may further represent and employ virtually any networking communication mediums, protocols, and the like, including, wireless mediums and protocols, DSL mediums and protocols, dial-up mediums and protocols, or the like, to enable network traffic to flow between client device 102 and another computing device.

Network 105 is configured to couple one computing device with another computing device. Network 105 may be enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 105 may also include an autonomous system of terminals, gateways, routers, and the like connected by wireless radio links, and the like. These connectors may be configured to move freely and randomly and organize themselves arbitrarily, such that the topology of network 105 may change rapidly.

Network 105 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, network 105 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of LLB 106 is described in more detail below in conjunction with FIG. 3. Generally, however, LLB 106 includes virtually any device that manages network traffic. Such devices may monitor a health and availability of network connections and potentially direct traffic based on any of a variety of criteria. Such devices include, for example, routers, proxies, firewalls, link load balancers, virtual private network (VPN) server, load balancers, cache devices, gateways, devices that perform Network Address Translation (NATs), port translations, sequence translations, or the like, any combination of the preceding devices, and the like. Thus, in one embodiment, LLB 106 may inspect incoming network packets, and may perform an address translation, port translation, a packet sequence translation, and the like, and route the network packet based, at least in part, on the packet inspection.

In one embodiment, LLB 106 may perform a packet-by-packet content switching decision for client-side requests. Thus, LLB 106 may, for example, control the flow of data packets delivered to and forwarded from a server, such as servers 108-110. LLB 106 may direct a request to a particular server based on network traffic, network topology, capacity of a server, content requested, and a host of other traffic distribution mechanisms. LLB 106 may receive packets from and transmit packets to network 105, the Internet, an intranet, or a local area network accessible through another network. LLB 106 may recognize packets that are part of the same communication, flow, and/or stream and may perform special processing on such packets, such as directing them to the same server so that state information is maintained. LLB 106 also may support a wide variety of network applications such as web browsing, email, telephony, streaming multimedia and other traffic that is sent in packets.

LLB 106 may communicate with servers 108-110 and/or client device 102 using any of a variety of network communication protocols, including TCP/IP, HTTP, and UDP, as well as any of a variety of other connection-oriented protocols, or the like. As such, LLB 106 may be configured to perform session setups, teardowns, sequencing, acknowledgements, flow control, and the like, between itself and another network device. Moreover, LLB 106 may also be configured to manage connection aggregation wherein multiple client devices may be enabled to provide requests on a same server-side connection. LLB 106 may further open and manage a connection pool for connections with servers 108-110.

LLB 106 may further provide several levels of monitoring of network connections to ensure that links and/or server outages or other limitations are detected quickly. In one embodiment, the monitoring of network connections and/or network paths may be performed out-of-band to other actions.

In one embodiment, LLB 106 is configured to provide client device 102 with a downloadable application. The downloaded application may enable client device 102 to receive path data and/or messages associated with network connections, and/or network paths. In one embodiment, LLB 106 may also provide client device 102 with information about how to employ the path data, such as providing settings as to which path data to employ, weighting factors to apply to one or more of the path data, or the like. In addition, such messages may enable client device 102 to employ an alternate network path to obtain a better connection.

LLB 106 may be implemented using one or more personal computers, servers, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. The BIG-IP® family of link controllers and traffic managers, by F5 Networks, Inc. of Seattle, Wash., are examples of products that may provide the above actions. The FirePass Controller is another example of products by F5 Networks, Inc. may also be used to provide the above actions.

As shown in the figure, LLB 106 may also be configured to be multi-homed. Thus, LLB 106 may include a plurality of physical connections into and/or out of it. The invention is configured to enable the application provided to client device 102 to re-establish connections between itself and LLB 106 that may leave client device 102 through a different link, and/or enter LLB 106 via a different link, thereby improving a quality and/or reliability of a network communications.

Servers 108-110 may include any computing device capable of communicating packets with another computing device. Each packet may convey a piece of information. A packet may be sent for handshaking, i.e., to establish a connection or to acknowledge receipt of data. The packet may include information such as a request, a response, or the like. Generally, packets received by servers 108-110 will be formatted according to TCP/IP, but they could also be formatted using another transport protocol, such as User Datagram Protocol (UDP), Internet Control Message Protocol (ICMP), NETbeui, IPX/SPX, token ring, and the like. Moreover, the packets may be communicated between servers 108-110 and another device employing HTTP, HTTPS, and the like.

In one embodiment, servers 108-110 are configured to operate as web servers. However, servers 108-110 are not limited to web servers, and may also operate messaging servers, File Transfer Protocol (FTP) servers, database servers, content servers, or the like. Additionally, each of servers 108-110 may be configured to perform a different operation. Thus, for example, server 110 may be configured as a messaging server, while server 108 is configured as a database server. Moreover, while servers 108-110 may operate as other than a website, they may still be enabled to receive an HTTP communication.

Devices that may operate as servers 108-110 include personal computers, desktop computers, multiprocessor systems, microprocessor-based or programmable consumer electronics, network PCs, servers, and the like.

In addition, although LLB 106 is illustrated as a separate network device, the invention is not so constrained. For example, LLB 106 may be incorporated within one or more of servers 108-110, without departing from the scope or spirit of the invention. As such, one of more of servers 108-110 may be multi-homed.

Figure 7:
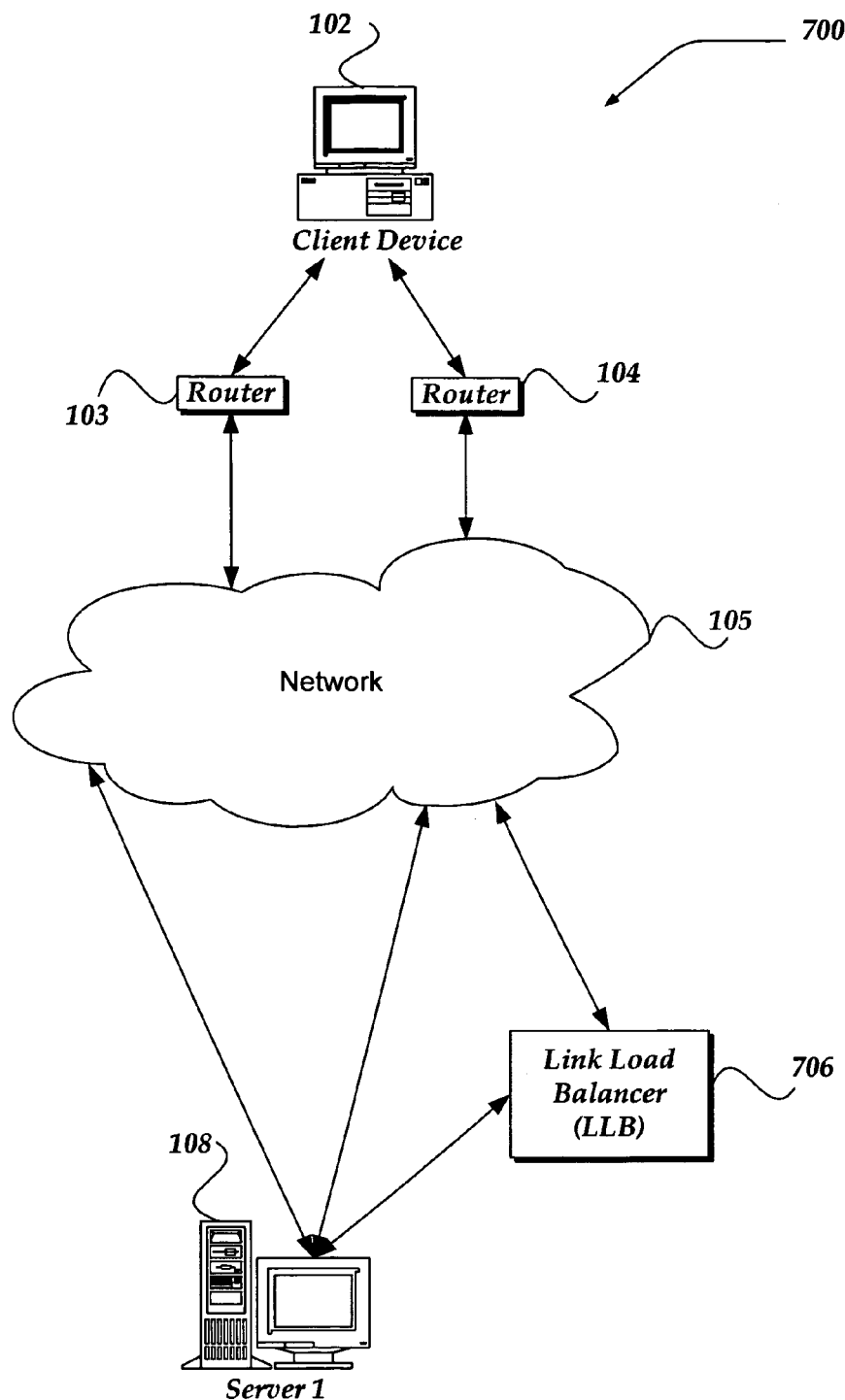
FIG. 7 shows a functional block diagram illustrating another embodiment of an environment for practicing the invention.
Figure 8:
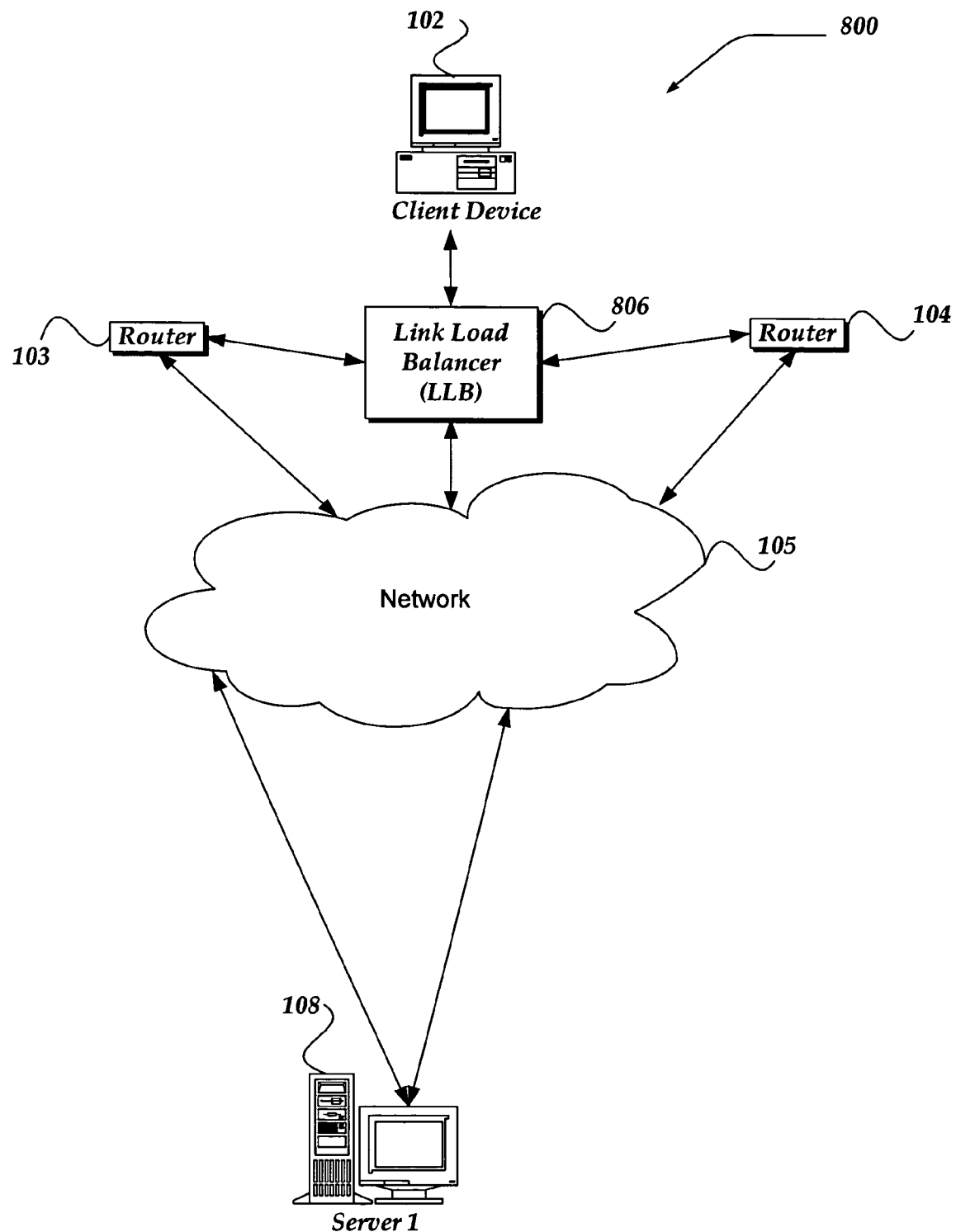
FIG. 8 shows a functional block diagram illustrating yet another embodiment of an environment for practicing the invention, in accordance with the present invention.

Moreover, placement of LLB 106 may vary for different environments. Thus, FIGS. 7-8 provide other embodiments for practicing the invention. For example, as shown in FIG. 7, a link load balancer (LLB 706) is situated "off-to the side," such that server 108 may communicate with network 105 by sending and receiving packets through LLB 706, or by not sending or receiving packets through LLB 706. Server 108 communications may also employ a hybrid communications, where some, but not all, packets travel through LLB 706, for example, only packets in one direction may travel through LLB 706 Moreover, as illustrated server 108 is also multi-homed. In this configuration LLB 706 might not provide a load balancing function to servers such as 108. Such a configuration might however be employed where a different traffic management device (not shown) is employed to manage server loads.

FIG. 8 illustrates one embodiment of the invention where the link load balancer (LLB 806) is situated on a client-side of network 105. In one embodiment, LLB 806 is within a client-side local area network (not shown) with client device 102. As shown, LLB 806 communicates with routers 103-104, network 105, and client device 102. As such, routers 103-104 might not communicate directly to client device 102, but may instead do so through LLB 806. Therefore, FIG. 8 illustrates the link load balancer situated locally to the client, while FIG. 1 and FIG. 7 illustrate the link load balancer situated remotely from the client.

LLB 706 of FIG. 7 and LLB 806 of FIG. 8, however, may be configured to operate substantially similar to LLB 106 of FIG. 1. However, LLB 706 and LLB 806 might not provide traffic management services to a plurality of servers, such as illustrated in FIG. 1. LLB 706 and LLB 806 will still be configured to monitor network connections, and provide path data, and/or messages to client device 102.

Illustrative Client Device

Figure 2:
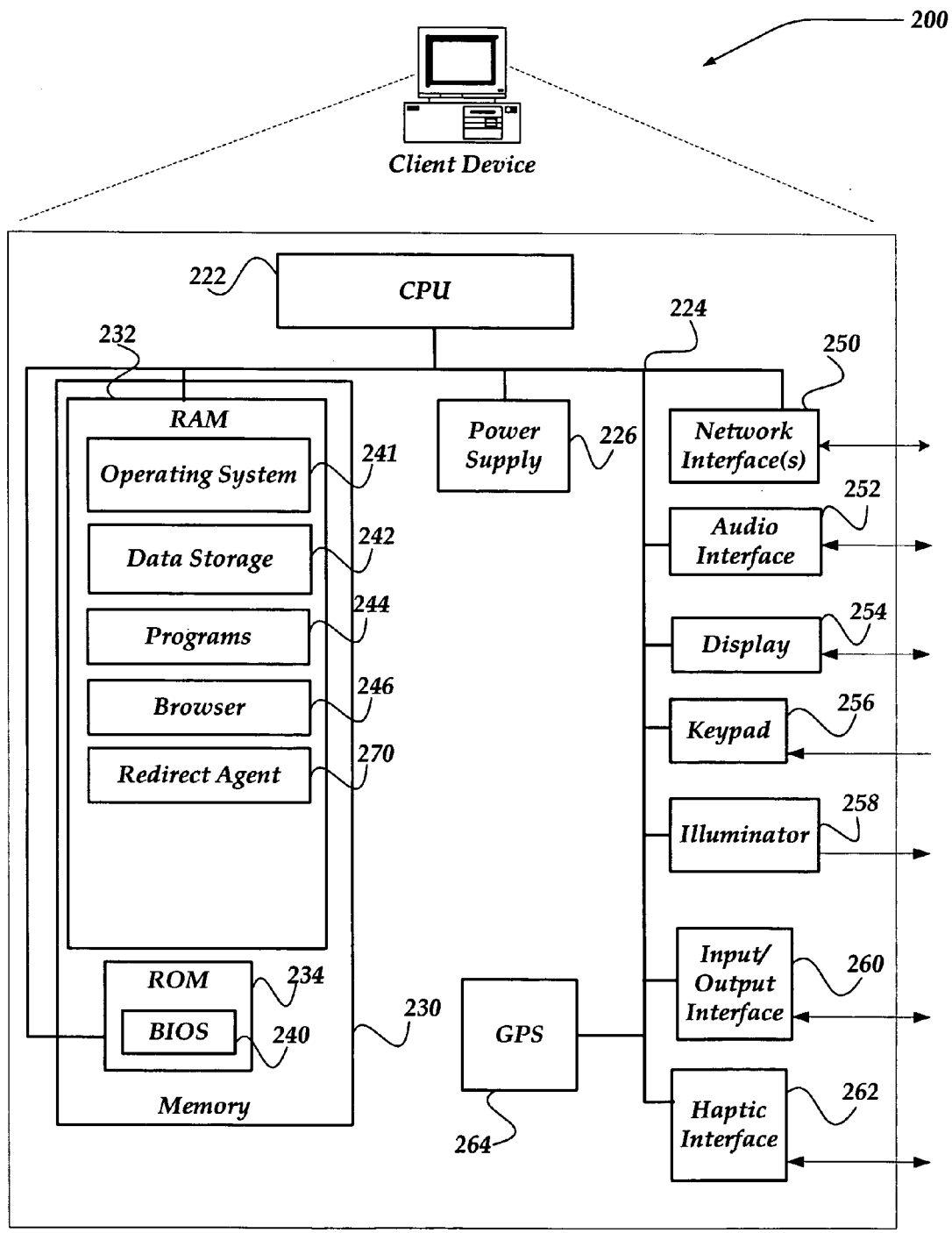
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Client device 200 also includes a power supply 226, one or more network interfaces 250, audio interface 252, display 254, keypad 256, illuminator 258, input/output interface 260, haptic interface 262, and optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 World-wide Interoperability for Microwave Access (WiMax), SIP/RTP, and the like. Network interface unit 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable audio telecommunication with others and/or generate an audio acknowledgement for some action. Thus, in one embodiment audio interface 252 may represent a sound card, or the like.

Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS and the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 242, which can be utilized by client device 200 to store, among other things, programs 244 and/or other data. For example, data storage 242 may also be employed to store information that describes available network connections, and various characteristics associated with the network connections. In addition, data storage 242 may include a routing table, and/or other similarly related networking information.

Programs 244 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, contact managers, task managers, transcoders, database programs, word processing programs, spreadsheet programs, games, and so forth. In addition, mass memory 230 may store browser client 246, and redirect agent 270.

Browser 246 may be configured to receive and to send web pages, web-based messages, and the like. Browser 246 may, for example, receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Redirect agent 270 is configured to monitor for network connection requests, and to select a network link based on path data. In one embodiment, the path data is obtained through a process that is 'out-of-band' to a process of selecting and employing the link to establish an alternate network connection. Thus, redirect agent 270 enables client device 200 to make decisions that can control network paths packets may take over a network towards a destination network device, including into a network device, such as LLB 106 and/or servers 108-110 of FIG. 1.

In one embodiment redirect agent 270 may employ various mechanisms to collect path data, including collecting metrics based on a network ping, a probe, or the like, a characteristic of a path including, but not limited, to its round trip time, network device failures, or the like. The metrics may also include link security metrics, such as a security characteristic of various links, paths, network connections, or the like. In one embodiment, redirect agent 270 receives at least some path data from another network device, such as LLB 106 or routers 103-104 of FIG. 1, or the like. Redirect agent 270 may also receive information that instructs it how to employ the path data, including settings as to which metric or metrics within the path data to employ, in part, in making a decision, a weighting to apply to one or more metrics, or the like. In one embodiment, even where redirect agent 270 collects its own path data, another network device, such as LLB 106 of FIG. 1 may also send path data and/or settings, including weights, or the like. Redirect agent 270 may store at least some of the path data and/or path data settings in data storage 242.

The term "path data" refers to data pertaining to one or more paths, and is not limited to a specific path, unless otherwise stated. Thus, when a device has established a connection over a path, the selection of an alternate path may include consideration of data pertaining to one or more alternate paths.

In one embodiment, redirect agent 270, or a portion thereof, may be provided to client device 200 through a download connection with another network device. In one embodiment, redirect agent 270 may be a script, a Java application, javascript, an application, an ActiveX control, or the like. Redirect agent 270, or a portion thereof, may be downloaded from a network device, such as LLB 106 of FIG. 1 at the time of establishing a connection with or through the network device, or at a later time. Redirect agent 270 may thereafter operate on client device 200 at least in part, by intercepting network connection requests from another component of client device 200, such as browser 246, or the like. Redirect agent 270 may determine whether it manages a network address associated with the network connection request. If it does, redirect agent 270 may employ a variety of mechanisms to select a link, and initiate establishment, or re-establishment of a network connection over the link with the requested network address (network device, or the like). Redirect agent 270 may also receive a message from another network device, such as LLB 106 of FIG. 1, instructing it to change a network path for sending data. Redirect agent 270 may employ processes 400 and 500 described below in conjunction with FIGS. 4-5 to perform at least some of its actions.

Illustrative Network Device

Figure 3:
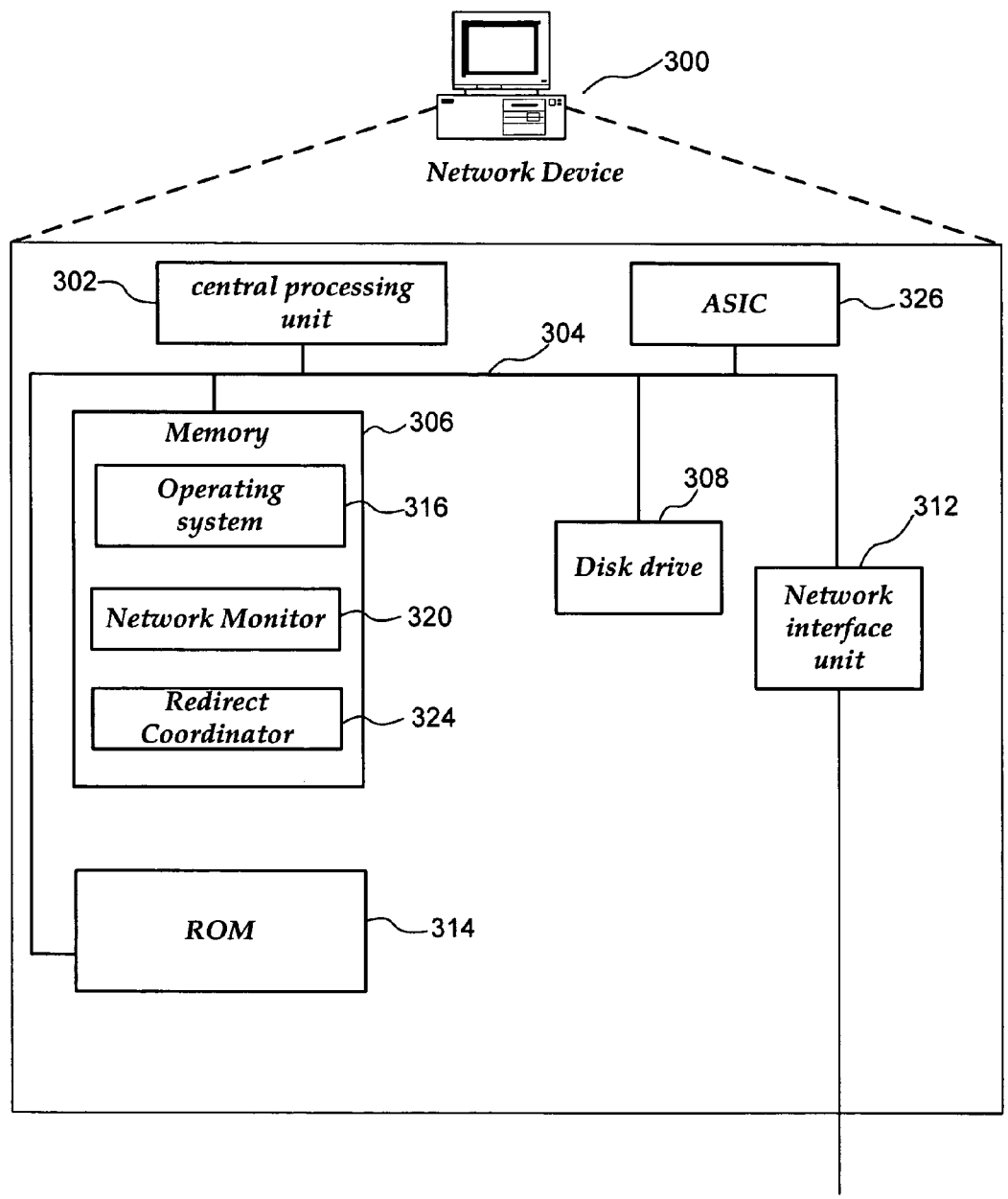
FIG. 3 shows one embodiment of a client device that may be included in a system implementing the invention.

FIG. 3 shows an exemplary network device 300 that may operate as LLB 106 of FIG. 1. It will be appreciated that not all components of network device 300 are illustrated, and that network device 300 may include more or less components than those shown in FIG. 3.

As illustrated in FIG. 3, network device 300 includes a central processing unit (CPU) 302, mass memory, and a network interface unit 312 connected via a bus 304. Network interface unit 312 includes the necessary circuitry for connecting network device 300 to network 105 of FIG. 1, and is constructed for use with various communication protocols including the TCP/IP and UDP/IP protocol. Network interface unit 312 may include or interface with circuitry and components for transmitting messages and data over a wired and/or wireless communications medium. Network interface unit 312 is sometimes referred to as a transceiver, Network Interface Card (NIC), or the like.

The mass memory generally includes random access memory ("RAM") 306, read-only memory ("ROM") 314, and one or more permanent mass storage devices, such as hard disk drive 308. The mass memory stores operating system 316 for controlling the operation of network device 300. The operating system 316 may comprise an operating system such as UNIX, LINUX™, or Windows™. In one embodiment, the mass memory may store program code and data for implementing network monitor 320 and redirect coordinator 324.

Network monitor 320 may be configured to employ various network monitoring mechanisms to evaluate a network connection, path, or the like. Such monitoring may include, for example, automatically creating Internet Control Message Protocol (ICMP) monitors, or the like, that check availability and detect a performance of various routers, and similar network devices, for a given network link. Monitoring may also include a transparent monitoring mechanism that checks availability of a network device or determines an availability of an entire link, including whether an error beyond the network device might lead to a loss of connectivity. Monitoring may further include examining a performance, quality, type, quantity, or other characteristics, of a network connection based on traffic that may pass through the network connection, or the like. For example, a quality of service metric based on one or more of a packet rate, a completion rate, a number of hops, or the like, may be employed. Monitoring may also include monitoring for changes in an availability of a network connection, network device, or the like, changes in a quality of a network path, connection, or the like. Monitoring may also include various characteristics of a network connection, path, link, or the like, including topology, link cost, round trip times, loads, bandwidth, congestion, costs, topological distance, or the like. Network monitor 320 may collect such path data in an out-of-band mode. That is, such data collection may be independent of a particular request for such information. However, the invention is not so limited, and the path data may also be collected based on a specific request for such information, without departing from the scope or spirit of the invention. In one embodiment, network monitor 320 is configured to perform a data analysis and reduction of at least some of the collected path data, such that a summary report, or the like, may be available.

Redirect coordinator 324 is configured to perform an analysis on at least some of the path data collected by network monitor 320. Redirect coordinator 324 may also provide or request that network monitor 320 provide at least some of the path data to a client device, such as client device 102 of FIG. 1, or the like.

Redirect coordinator 324 is further configured to make a determination based on the path data analysis as to whether an alternative network path might be available that may result in a better network connection between network device 300 and the client device. Such determination may be based on a policy decision, a change in the network connection, a type of request, or the like. If redirect coordinator 324 determines that an alternate network path is to be used, redirect coordinator 324 may provide a message, such as a control channel message, or the like, to the client device, indicating direction to select a link in order to establish an alternate network path. The client device may then establish a network connection through the selected link, resulting in an alternate network path. Redirect coordinator 324 may use, for example, process 600 of FIG. 6 described below to perform at least some of its actions.

In one embodiment, network device 300 includes one or more Application Specific Integrated Circuit (ASIC) chip 326 connected to bus 304. As shown in FIG. 3, network interface unit 312 may connect to 304 bus through at least one ASIC chip. ASIC chip 326 can include logic that enables at least some of the actions of network device 300. For example, in one embodiment, ASIC chip 326 can be employed to perform packet processing functions on incoming and/or outgoing packets. In one embodiment, ASIC chip 326 performs logic for network monitor 320 and/or redirect coordinator 324. In one embodiment, network device 300 includes one or more field-programmable gate arrays (FPGA) (not shown), instead of, or in addition to, ASIC chip 326. A number of actions for the network device can be performed by ASIC chip 326, an FPGA, CPU 302 with instructions stored in memory, or any combination of actions performed by the ASIC chip, FPGA, and CPU.

Computer storage media may include volatile and nonvolatile, removable and non-removable media implemented in any method or technology for storage of information, such as computer readable instructions, data structures, program modules or other data. Examples of computer storage media include RAM 306, ROM 314, EEPROM, flash memory and/or any other memory architecture, CD-ROM, digital versatile disks (DVD) and/or any other optical storage, magnetic cassettes, magnetic tape, magnetic disk storage and/or any other magnetic storage devices, and/or any other medium that can store information that can be accessed by a computing device.

Network device 300 may also include an input/output interface (not shown) for communicating with external devices or users.

Network device 300 can also be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to the blade server. Network device 300 can also be implemented as a combination of blades and additional components in the chassis.

Generalized Operation

Figure 4:
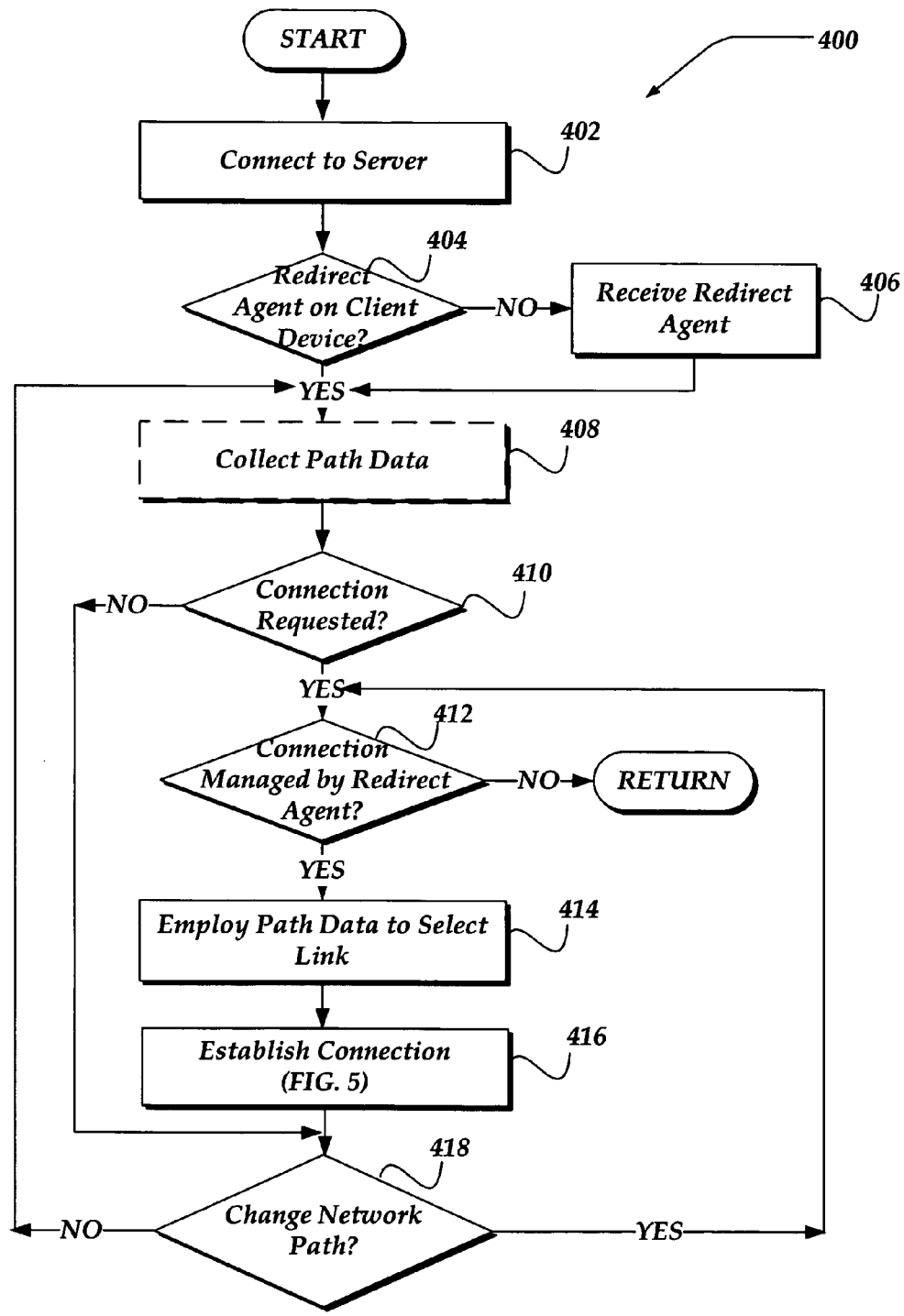
FIG. 4 illustrates a logical flow diagram generally showing one embodiment of a process for managing a network communication by enabling a client device to redirect network traffic.

The operation of certain aspects of the invention will now be described with respect to FIGS. 4-5. FIG. 4 illustrates a logical flow diagram generally showing one embodiment of a process for managing a network communication by enabling a client device to make decisions for routing a packet. Such actions thereby enable the client device to control the path that an outbound packet may take over a network towards a server. In one embodiment, process 400 of FIG. 4 and process 500 of FIG. 5 may be implemented within client device 102 of FIG. 1.

Process 400 begins, after a start block, at block 402 where the client device requests an initial connection with a server, link load balancer, or the like. Such request may include an OSI layer 3 connection request or the like. Processing then proceeds to decision block 404.

At decision block 404, a determination is made whether a redirect agent resides on the requesting client device. Such determination may be accomplished by receiving from another device, such as the server, link load balancer, or the like, an interrogation message at the client device, providing a cookie correspondence from the client device, or the like, to the other device, or the like. In one embodiment, the redirect agent may be configured to provide a message indicating its presence as part of the initial request for a connection. However, the invention is not limited to any of these approaches, and another mechanism may be employed to determine a presence of a redirect agent on the client device. For example, the invention may be configured to assume that a redirect agent is not present on the requesting client device. In any event, if it is determined that a redirect agent is not on the client device (or that one is assumed not to reside on the client device), processing flows to block 406; otherwise, processing flows to block 408. At block 406, the redirect agent may be provided to the requesting client device from the server, link load balancer, or other device, such that it may then be installed on the requesting client device. In one embodiment, the redirect agent is installed automatically, and perhaps transparently, for an end-user of the client device. Processing then continues to block 408.

At block 408, and in one embodiment of the invention, the redirect agent may commence collecting path data about various network connections or network paths. Such collection of path data may include performing pings, probes, or the like, on various network connections or network paths. The collection of path data may also be performed by peering with another network device, such as a router, including a border gateway router or the like, and receiving information from the router, such as in the form of a routing table, or the like. The path data may also include various metrics, including cost information associated with a network path, link, or the like, network end-point information, type of network connections, capacity of a network connection, quality of a network path, round trip time, latencies, security information about a path and/or network connection, or virtually any other path data that may be employable in managing a network traffic decision. Moreover, the path data may include a combination of one or more of the above. In one embodiment, the redirect agent may employ a data store to store and manage the received path data.

In one embodiment, the redirect agent may also receive path data out-of-band, from another network device, such as LLB 106 of FIG. 1, or the like. Moreover, LLB 106, or another network device, may also be collecting path data regarding various network connections, and/or paths, between itself and the client device, in an out-of-band mode. As described herein, such out-of-band data collection refers to collection of path data independent of a specific request for such data collection, or the like. Thus, although block 408 is illustrated herein at this juncture, it is done so merely to describe such actions. For example, block 408 may continue to be performed while other actions of process 400 and/or 500 are also being performed.

Moreover, in another embodiment of the invention, the redirect agent on the client device may also be configured not to perform its own path data collection actions. For example, the redirect agent may be configured to receive the path data from another network device rather than perform actions that actively seek out and collect path data. Thus, in various embodiments, the redirect agent and another network device may each collect path data, and/or share such path data; the other network device may provide the redirect agent with path data without the redirect agent performing queries for the path data itself; or even, the redirect agent may collect the path data without such information from the other network device. It should also be noted, that the redirect agent and the other network device may collect and share different path data. Thus, for example, the other network device may collect path data about connections into itself and/or another network device, while the redirect agent may collect path data about connections out of the client device.

Moreover, in one embodiment, the redirect agent on the client device may also receive path data settings that may direct the redirect agent as to which path data metrics are to be employed in making a traffic decision, what weights to apply to one or more of the metrics within the path data, or the like.

In any event, processing continues to decision block 410, where a determination is made whether another connection is requested. The other connection may include a request for a connection to a network server or the like, that may be different from, or the same as, the connection at block 402. For example, in one embodiment, the connection request at decision block 410 may be a request for a network connection to a network server over a Virtual Private Network (VPN) connection, or the like. The network connection request could also include, for example, an HTTP request for data, from a browser application, or the like, residing on the client device, and may pass a content identifier, such as Uniform Resource Locator (URL). However, the connection requests are not limited to these examples, and virtually any other network connection may be requested including, an SSL connection, a DSL connection, an 802.11 wireless connection, or the like. In any event, if a network connection is requested, processing flows to decision block 412; otherwise, processing may loop back to block 408, to continue collection of path data.

At decision block 412, the request for the network connection may be forwarded to the redirect agent. In one embodiment, this may arise because the redirect agent is configured to be a default network address for network requests from the client device. Thus, at decision block 412, a determination is made whether the requested network connection is one that the redirect agent is actively managing. This may be the case, for example, where the redirect agent is configured to manage a subset of network connections, rather than all possible network connections. For example, redirect agent may be configured to manage those network connections that are directed toward a set of network devices, such as LLB 106 and/or servers 108-110 of FIG. 1, rather than to a different server (not shown). The determination 412 of whether the connection is managed by the redirect agent may also be made on other criteria pertaining to the type of connection, the status of the client device, or network metrics. Thus, if it is determined that the redirect agent is not configured to manage the requested network connection, processing may return to a calling process to perform other actions, including enabling another client component to complete the network request.

Alternatively, if at decision block 412, the redirect agent is configured to manage the requested network connection, processing proceeds to block 414. At block 414, the redirect agent employs the path data to select a network link between the client device and the requested network device. Selection of the link may be based on any of a variety of criteria. For example, selection of the network link may be based on a policy. Such policy may be configured at LLB 106 of FIG. 1, for example, and be based on any of a variety of criteria, including a various static policies such as a topology weighting, a link cost, or the like, a dynamic policy such as might be based on a load over a network path, a round trip time between network devices, or the like.

The selection of the network link may also be based, at least in part, on changes in availability of a network connection between the client device and the requested network device (URL, network address, or the like). Such changes may arise due to non-responsiveness of the client device, the requested network device, or the like, through a particular network connection, connection end-point link, or the like.

The selection of the network link may further be based, at least in part, on changes in a quality of a network connection between the client device and the requested network device. Such quality changes may be determined based on any of a variety of conditions, including a value of a latency metric, such as a RTT between the client device and the requested network device, or the like, a detection of a percentage of successful pings to a network termination that may drop below some predetermined percentage threshold, or the like.

In addition, the selection of the network link may be based, at least in part, on a determination based on a request type. For example, the request type may be for content that might be better served over a high-speed link, such as a DSL line, or the like, rather than a low-speed link, such as a dial-up modem, or the like. The request type may also include a request for a secure connection, a request for a particular type of connection, a request for a particular type of application, data, or so forth.

Processing moves next to block 416, which is described in more detail below in conjunction with FIG. 5. Briefly, however, at block 416 the link selected at block 414 is employed to establish an alternate connection with the requested network device. In one embodiment, this may include establishing the alternate connection with the requested network device through an alternate network link out of the client device and/or into the requested network device. In one embodiment, the invention may employ multiple connections between the client device and the requested network device. Moreover, establishing the alternate network connection may be performed such that a communication session between the client device and the requested network device is maintained. For example, if an SSL session, HTTPS session, or the like is open and active between the client device and the requested network device, that communication is not lost. For example, any security channels, handshakes, certificate transfers, or the like, employed to initiate a session, and any other state information associated with the session is maintained and/or transferred to the alternate network connection over the selected link, in a seamless or transparent manner as perceived by an end-user of the client device. In one embodiment, an SSL session operating through a link is resumed through the selected link. Resuming an SSL session is described in the Netscape SSL document referred to above. In one embodiment, use of a link may be preserved to maintain the session, such as with an IPSec connection. Thus, in one embodiment the selected link may be a same link employed for the connection and the alternate connection.

Processing continued to decision block 418, where a determination is made whether to change the network path between the client device and the requested network device. This may arise based on a variety of situations or combinations thereof. For example, in one embodiment, the client device may receive a message from another network device, such as LLB 106 of FIG. 1 requesting the redirect agent use an alternate network path to the requested network device. The message may be, in one embodiment, a control channel type message. In one embodiment, the redirect agent may determine to employ an alternate network path without receiving a request from the redirect agent. In any event, if the network path is to be changed, processing loops back to decision block 412 to perform substantially as described above. Otherwise, processing loops back to block 408, to continue as described above.

Figure 5:
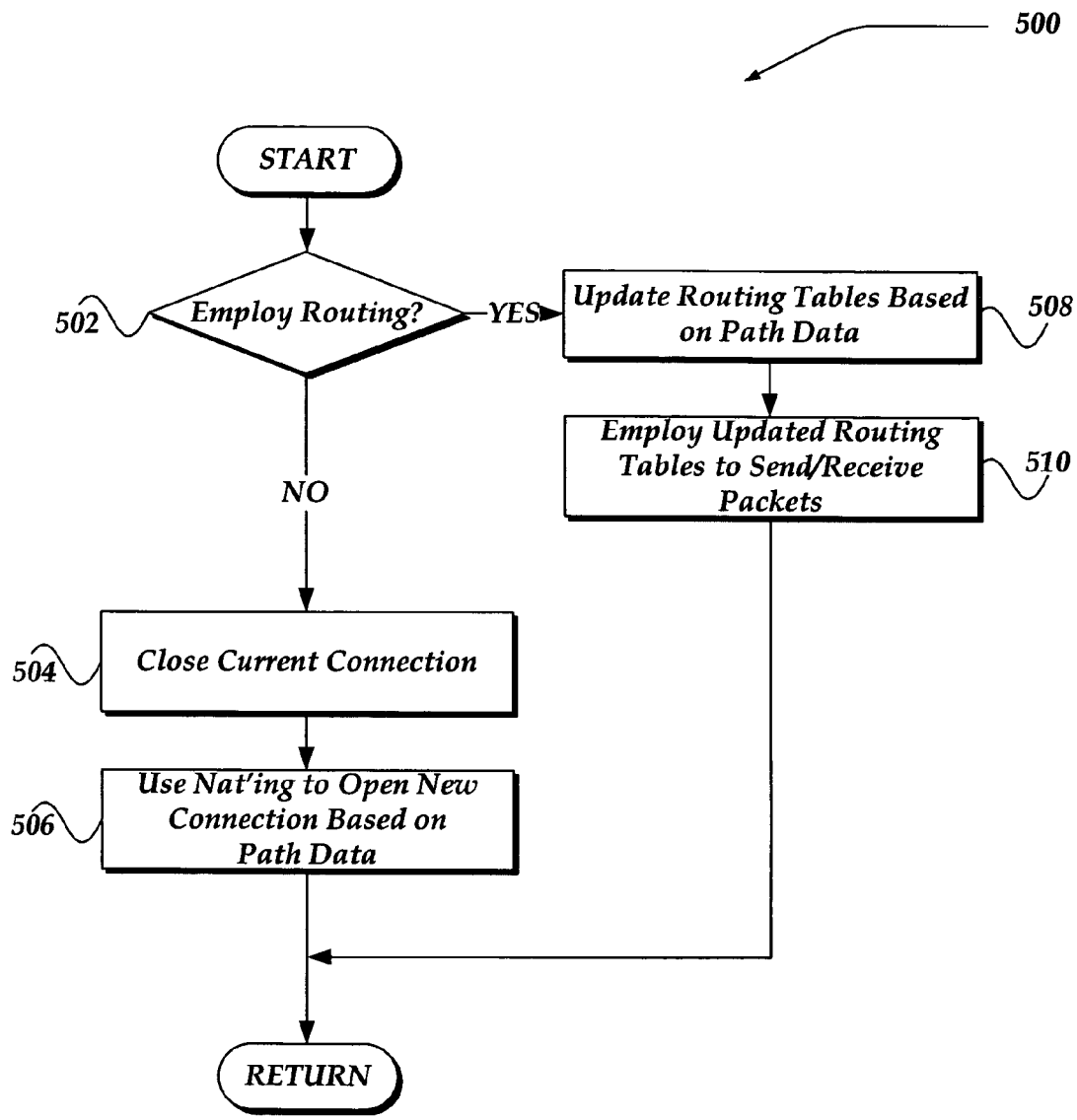
FIG. 5 illustrates a logical flow diagram generally showing one embodiment of a process for re-establishing a network connection.

FIG. 5 illustrates a logical flow diagram generally showing one embodiment of a process for establishing/re-establishing a network connection by the client device. Process 500 of FIG. 5 may be employed within block 416 of FIG. 4, and further illustrates establishing a network connection employing at least one of routing or NAT'ing (Network Address Translations).

As shown in the figure, process 500 begins, after a start block, at decision block 502, where a determination is made whether to employ routing to establish the network connection. Routing may be employed where the redirect agent is operating as an IP router, is enabled to specify a network hop of its packets, can adjust routing tables employable to forward packets, or the like. If routing is to be employed to establish the connection, processing proceeds to block 508; otherwise, processing flows to block 504, where a NAT'ing approach may be employed.

At block 508, routing tables may be updated. In one embodiment, if the client device's operating system is configured to control routing, the redirect agent may be configured to update the operating system's routing tables. In any event, path data may be employed to update the routing tables.

Processing then flows to block 510, where the updated routing tables may be employed to send and/or receive packets over an alternate network path. In one embodiment, such rerouting might not include closing an existing connection and then re-opening a new connection.

In one embodiment, if the redirect agent is configured to operate as a gateway, or the like, such as for another application on the client device (e.g., for SSL, VPN, or the like), the redirect agent may selectively preserve a last hop for responses to inbound requests for data, and optimize an outbound network request. In one embodiment, the redirect agent may employ a connection table to perform such actions. Thus, in one embodiment, the redirect agent may be configured to perform asymmetric routing to optimize performance, preserve the last network hop by sending responses out a same network interface requests are received, preserve links that an existing connection flows through, or the like. Upon completion of block 510, processing then returns to a calling process to perform other actions.

Alternatively, at block 504, NAT'ing may be employed to establish/re-establish the network connection with the other network device. In this embodiment, the redirect agent may close a current connection to the other network device. Then processing may proceed to block 506, where a new connection may be opened, or re-opened, to the network device, perhaps employing a different network address provided by the other network device, or the like. In one embodiment, when the new connection is opened, the client device and other network device may share control information that enables the other network device to update its connection side tables such that the connection is resumed with the client device in a stateful, seamless way. Processing then returns to the calling process to perform other actions.

Figure 6:
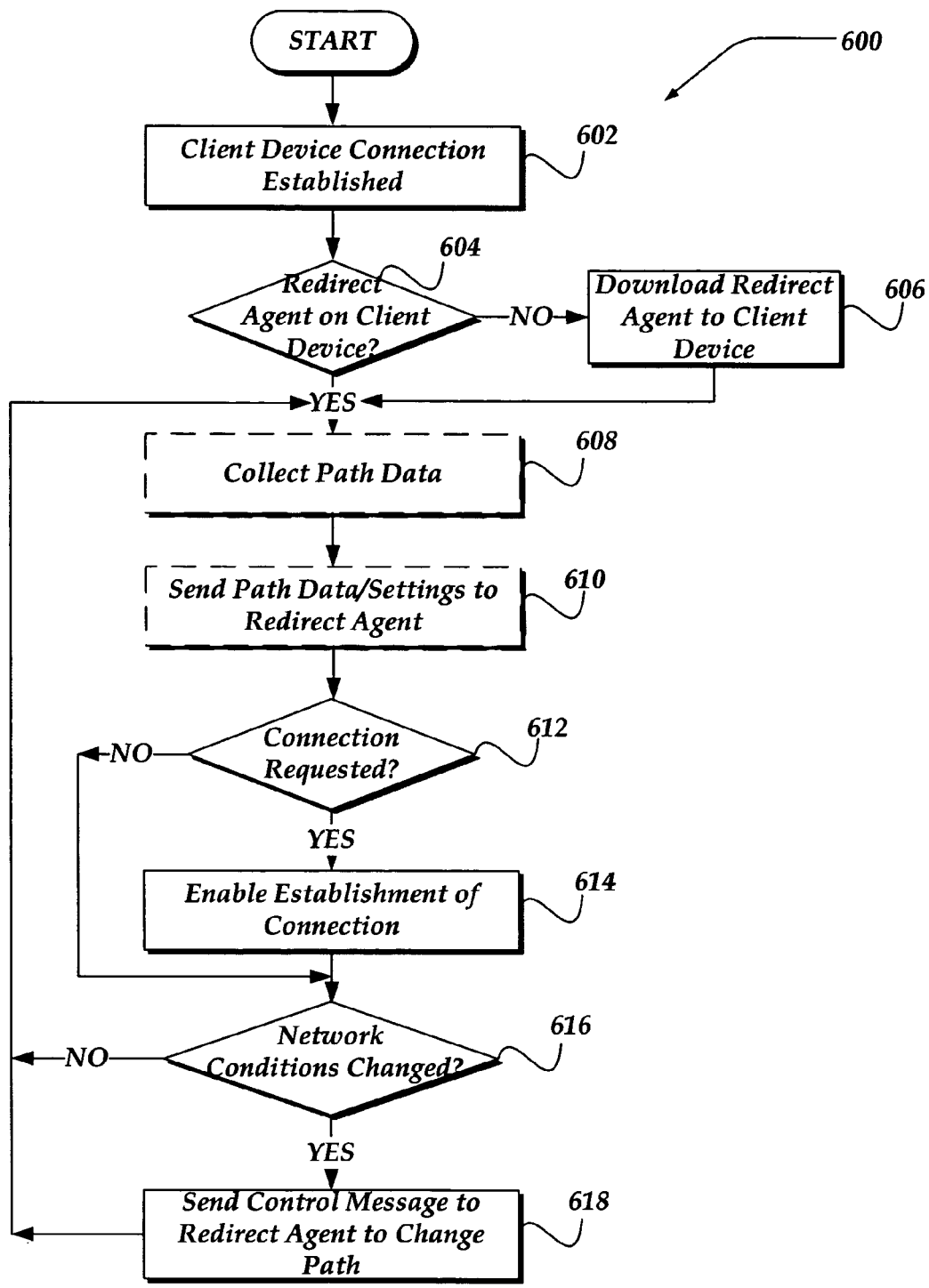
FIG. 6 illustrates a logical flow diagram generally showing one embodiment of a process for enabling a client device to re-establish a network connection for communicating a packet.

FIG. 6 illustrates a logical flow diagram generally showing one embodiment of a process for enabling a client device to manage a network connection for communicating a packet, in accordance with the present invention. Process 600 of FIG. 6 may be implemented in LLB 106 of FIG. 1, for example.

Process 600 begins, after a start block, at block 602 where a client device requests an initial connection, and the initial connection is established. Processing proceeds next to decision block 604, where a determination is made whether a redirect agent is on the client device. As described above, this may be determined employing any of a variety of mechanisms, including assuming that one is not on the client device. In any event, if a redirect agent is determined (or assumed) to not reside on the client device, processing flows to block 606; otherwise, processing flows to block 608. At block 606, the redirect agent is downloaded to the client device. In one embodiment, a portion of a redirect agent may already reside on the client device, and a second portion is downloaded at block 606. As described above, the redirect agent, or portion thereof, may be downloaded from LLB 106. Processing then flows to block 608.

At block 608, path data collection may be performed. As described above, such path data collection may be performed while other actions of process 600 are also being performed. Thus, block 608 (and block 610) are illustrated at this juncture, merely to provide a complete understanding of the invention and not to suggest an ordering or sequencing of actions. Moreover, path data collection may also have been performed by this process prior to connecting with the client device. Such path data collection may include collecting path data about various network connections out of, and/or in proximity to, the present network device (e.g., LLB 106, or the like). Processing flows next to block 610, where, in one embodiment, the collected path data may be provided to the redirect agent. Again, as stated above, such path data may not be provided, and rather merely a subset of the information may be provided, a summary of the information, or only a message indicating a request to change network paths may be provided to the client device, or any combination of the above. In one embodiment, settings associated with which path data to employ, and/or what weightings to apply to the selected path data, may be provided to the redirect agent, whether or not path data is also provided to the redirect agent.

Processing continues to decision block 612, where a determination is made whether a request to establish a connection is received. If it is, processing flows to block 614, where the connection may be established. Processing then flows from block 614 to decision block 616. Otherwise, if no request is received, processing loops back to block 608, to illustrate a continuation of path data collection.

At decision block 616, a determination is made whether network conditions have changed. As described above, such determination may be based on a variety of criteria, including, but not limited to, a static policy, changes in availability of a network connection, changes in a quality of a network connection, a change in a request type, or the like. In any event, if the conditions are determined to have changed, processing flows to block 618; otherwise processing loops back to block 608.

At block 618, a control message may be sent to the redirect agent on the client device requesting the client device to change a network path to provide a better connection. Processing then loops back to block 608 to continue looping through process 600 until the client device terminates its sessions with the network device.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing a communication over a network, comprising:
   a transceiver for receiving and sending packets to a client; and
   a processor having program code and data that is configured to send a redirect agent to the client, wherein the redirect agent is programmed to enable the client to perform actions comprising:
      establishing a connection over a path to a server, the connection enabling a session between the client and the server;
      receiving, from the network device, a path data setting and a request to change the path to the server;
      collecting path data about a plurality of different possible connections to the server, the path data including metrics about each of the plurality of different possible connections wherein the path data is collected by the client in an out-of-band mode independently of the request to change the path to the server;
      selecting a link by evaluating each of the plurality of different possible connections to the server based on the independently collected path data and the path data setting, wherein the path data setting instructs the redirect agent as to how the metrics within the path data are weighted and employed in the selection; and
      establishing an alternate connection to the server over the link, wherein the alternate connection enables the session between the client and the server to be maintained.

2. The network device of claim 1, wherein additional path data is further received from the network device by the client, the network device being a link load balancer.

3. The network device of claim 1, further comprising means for providing additional path data to the client.

4. The network device of claim 1, wherein the network device is situated remotely from the client.

5. The network device of claim 1, wherein establishing the alternate connection further comprises modifying a routing table.

6. The network device of claim 1, wherein establishing the alternate connection further comprises closing the connection to the server, and opening another connection to the server.

7. The network device of claim 6, wherein opening the other connection further comprises employing a different network address to the server from a first network address to the server used for the closed connection to the server.

8. The network device of claim 1, wherein selecting the link further comprises employing a different outbound link from the client.

9. The network device of claim 1, wherein selecting the link further comprises employing a different inbound link to the server.

10. The network device of claim 1, wherein the client employs both the alternate connection and the connection to the server to send network traffic towards the server, wherein the same network traffic is sent over both the connection and the alternate connection.

11. The network device of claim 1, wherein the client is multi-homed.

12. The network device of claim 1, wherein the server is multi-homed.

13. The network device of claim 1, wherein each of the connection and the alternate connection to the network from the client is a wireless connection.

14. The network device of claim 1, wherein the message from the network device is a channel control message.

15. The network device of claim 1, wherein the request to change the path to the server is determined by the network device based, at least in part, on one of a policy decision, a change in availability of the network between the client and the server, or a change in a quality of the network between the client and the server.

16. The network device of claim 1, wherein the path data is gathered, at least in part, by the client.

17. The network device of claim 1, further comprising program instructions for sending the path data, at least in part, to the client.

18. The network device of claim 1, further comprising program instructions for sending to the client the path data setting, wherein the path data setting is associated with the path data, and indicates at least one of which path data to employ to select the connection over the path and the alternate connection over the alternate path, or what weight to apply to at least one metric within the path data.

19. A method operating on a client, the method useable for managing a communication between the client and a server over a network, comprising:
 establishing a connection over a path to the server, the connection enabling a session between the client and the server, wherein at least one of the server or the client is multi-homed;
 determining, in part, at a network device, whether to change the path to the server, and if it is determined that the path to the server is to be changed:
  sending a path data setting from the server to the client;
  collecting, by the client, path data about a plurality of different possible connections to the server, wherein the path data includes network metrics about the different possible connections, and wherein the path data is collected by the client in an out-of-band mode independently of a request from the network device to the client to change the path to the server;
  selecting, by the client, a link based on the client analyzing the independently collected path data for the different possible connections, wherein the analysis is based on the path data setting instructing the client as to how the network metrics are weighted and employed in the selection; and
  establishing, by the client, an alternate connection over the link to the server, wherein the alternate connection enables the session between the client and the server to be maintained.

20. The method of claim 19, wherein if it is determined that the path to the server is to be changed further comprises: sending, from the network device to the client, a request to change the path.

21. The method of claim 19, wherein determining whether to change the path further comprises the client determining to change the path based, at least in part, on a change in the network as indicated by at least some of the path data.

22. The method of claim 19, wherein determining whether to change the path to the server is based on at least one of a policy configured at the server, a change in availability of at least a portion of the network between the client and the server, or a change in a quality of at least a portion of the network between the client and the server.

23. The method of claim 19, wherein selecting the link further comprises selecting a link into the multi-homed server, selecting a link out of the multi-homed client, or selecting links both into the multi-homed server and out of the multi-homed client.

24. The method of claim 19, wherein the connection and the alternate connection to the network from the multi-homed server or the multi-homed client are wireless connections.

25. The method of claim 19, wherein determining whether to change the path to the server further comprises receiving a message from at least one of a link load balancer device, or the server.

26. The method of claim 19, wherein establishing the alternate connection to the server further comprises employing at least one of a routing protocol or a network address translation protocol to establish the alternate connection.

27. A non-transitory, processor-readable storage medium having machine executable instructions stored thereon, which when executed by at least one processor causes the at least one processor to perform one or more actions for managing a communication between a client and a server over a network, comprising:
 establishing a connection over a path between the client and the server over the network, the connection enabling a session between the client and the server, wherein at least one of the client or the server is multi-homed to the network;
 sending to the client a redirect agent for use in managing network connections by the client;
 sending, to the client, path data and a path data setting, wherein the path data includes metrics about a quality or a capacity for each of a plurality of different possible network connections;
 receiving, at the client, a request to change the path to the server; and
 establishing an alternate connection over a link to the server, the link being selected based, at least in part, on the path data setting and the client performing an evaluation of the path data for each of the plurality of different possible network connections, wherein the path data setting instructs the client as to how the metrics within the path data are weighted and employed in the evaluation, wherein the path data is collected in an out-of-band mode independently of the received request to change the path to the server; and wherein the alternate connection is used to transfer the session to the alternate path to the server.

28. The non-transitory, processor-readable storage medium of claim 27, further comprising:
 sending, to the client the path data setting associated with the path data, the path data setting indicating at least one of which metric within the path data to employ or a weighting to apply to the path data.

29. The non-transitory, processor-readable storage medium of claim 27, wherein establishing the alternate connection to the server further comprises modifying a routing table at the client.

30. The non-transitory, processor-readable storage medium of claim 27, wherein establishing the alternate connection to the server further comprises closing the connection to the server, and opening the alternate connection to the server.

31. The non-transitory, processor-readable storage medium of claim 30, wherein selecting the link further comprises employing a different network address to the server from a first network address to the server used for a closed connection to the server.

32. The non-transitory, processor-readable storage medium of claim 27, wherein selecting the link further comprises selecting a different outbound link from the client than is employed with the connection.

33. A load controller for managing a communication between a client and a server wherein at least one of the client or the server is multi-homed to a network, comprising:
 a transceiver to send and receive data over the network; and
 a redirect component that is programmed to perform actions comprising:
  establishing a first connection with the client over the network;
  sending to the client a component for use in managing network connections by the client, wherein the client has a second connection over a second path to the server, the second connection enabling a session between the client and the server;

monitoring path data associated with the client and the server;

sending to the client a path data setting and at least some of the path data, other path data being collected by the client independent of the load controller and in an out-of-band mode independently of a message requesting a change in the path between the server and the client, wherein the path data and the other path data includes network metrics for a plurality of potential connections between the client and the server; and if a network change is detected, sending to the client the message requesting the change in the path between the server and the client, wherein the client is enabled to employ the path data setting and the independently collected path data and other path data to select a link, and to establish a third connection over the link to the server from anyone of the plurality of potential connections between the client and the server so that the session to be maintained, and wherein employing the path data setting, the path data, and the other path data includes:

instructing the client, based on the path data, as to how the network metrics within the path data and other path data are weighted and employed in the selection.

34. An apparatus for managing a communication between a client and a server over a network connection over a path that enables a session between the client and the server, at least one of the client or the server being multi-homed to the network, comprising:

a transceiver to send and receive data over the network;

means for enabling the client to manage network traffic decisions, wherein the means further enables the client to collect path data that includes network metrics about each of a plurality of potential network connections between the client and the server, wherein the path data is collected by the client in an out-of-band mode independently of a request from the apparatus to the client requesting a change in the path to the server;

means for providing additional path data and a path data setting to the client;

means for determining a change in a network between the client and the server; and means for, if a network change is detected, requesting the change in the path between the server and the client, wherein the client is enabled to employ the path data and the path data setting to select a link based on the independently collected path data and the additional path data, the path data setting instructing the client as to how the network metrics within the path data and other path data are weighted and employed in the selection, and wherein the client is enabled to establish an alternate connection over the link to the server so that the session is maintained.

35. The apparatus of claim 34, the means for enabling a client comprising sending, to the client, a redirect agent that selects a link and establishes a connection over the link.

36. A system for managing a communication between a client and a server over a network connection over a path that enables a session between the client and the server, comprising:

a network device local to the server;

a redirect agent; and a traffic management component that is programmed to send the redirect agent to the client;

wherein the redirect agent is programmed to enable a processor within the client to perform actions when activated on the client, comprising:

establishing a connection over the path between the client and the server, the connection enabling the session between the client and the server;

receiving, from the network device, a request to change the path to the server and a path data setting;

collecting path data that includes network metrics about each of a plurality of possible connections between the client and the server, wherein the path data is collected by the client in an out-of-band mode independently of the request to change the path to the server;

in response to the request to change the path, selecting a link based on the independently collected path data and the path data setting, wherein the path data setting instructs the redirect agent as to how the network metrics within the path data are weighted and employed in the selection; and establishing an alternate connection over the link, the alternate connection enabling the session between the client and the server.

37. The system of claim 36, wherein the traffic management component is further programmed to send at least a portion of the path data to the client.

* * * * *

UNITED STATES PATENT AND TRADEMARK OFFICE
CERTIFICATE OF CORRECTION

| | | |
|---|---|---|
| PATENT NO. | : 7,945,678 B1 | Page 1 of 1 |
| APPLICATION NO. | : 11/246342 | |
| DATED | : May 17, 2011 | |
| INVENTOR(S) | : Bryan D. Skene | |

It is certified that error appears in the above-identified patent and that said Letters Patent is hereby corrected as shown below:

In column 2, line 59, delete "'link'" and insert -- "link" --, therefor.

In column 11, line 28, delete "(SMGL)," and insert -- (SGML), --, therefor.

Signed and Sealed this
Tenth Day of January, 2012

David J. Kappos
*Director of the United States Patent and Trademark Office*